May 22, 1962    M. A. CONANT    3,035,816
FOOT LEVER FOR A HAND SHOVEL
Filed July 22, 1958    3 Sheets-Sheet 1

INVENTOR
MELVIN A. CONANT

BY
ATTORNEY

May 22, 1962  M. A. CONANT  3,035,816
FOOT LEVER FOR A HAND SHOVEL
Filed July 22, 1958  3 Sheets-Sheet 2

INVENTOR
MELVIN A. CONANT

BY *Leonard Bloom*

ATTORNEY

May 22, 1962

M. A. CONANT 3,035,816

FOOT LEVER FOR A HAND SHOVEL

Filed July 22, 1958

INVENTOR
MELVIN A. CONANT

BY Leonard Bloom

ATTORNEY

United States Patent Office 3,035,816
Patented May 22, 1962

3,035,816
FOOT LEVER FOR A HAND SHOVEL
Melvin A. Conant, 175 Slocum Crescent,
Forest Hills, Long Island, N.Y.
Filed July 22, 1958, Ser. No. 750,263
6 Claims. (Cl. 254—131.5)

This application is a continuation-in-part of my present application filed on November 29, 1956, and identified by Serial Number 625,010 and now abandoned.

My invention relates to shovels, and more particularly, to an attachment for a hand shovel that will enable it to be operated with considerably less strain and physical exertion.

In the normal manner of using a hand shovel, the operator is forced to assume an awkward and crouched position over the shank of the shovel and to grasp the shank of the shovel with one hand at the balance thereof and the other hand at or near the extremity thereof. The operator then forces the blade of the shovel into the material, lifts the load on the blade, and flings the material to one side. If the material is snow, soft earth, or sand, it is relatively easy to insert the blade into it; and once the inertia of the load has been overcome, it is again relatively easy to continue to lift the load and to deflect it or dump it to one side or the other.

However, the greatest strain of the shoveling operation lies in imparting the initial acceleration to the lifting of the load, or in other words, to overcome its inherent inertia with an accelerating force greater than the combined weight of the shovel and its load. This portion of the shoveling operation must be performed from a portion that it not only awkward, crouched, uncomfortable, and physiologically-strained, but also one that involves an adverse mechanical leverage. It is exceedingly difficult for most people and may ultimately lead to, or otherwise greatly aggravate numerous human ills, such as hernia, muscular, bone and back troubles, and often, heart failure.

Accordingly, it is the general object of the present invention to provide an improved hand shovel that will lessen the strain on the muscles, back, and heart of the human oeprator.

It is a specific object of the present invention to provide an improved hand shovel, or an attachment for an existing hand shovel, that will allow the initial accelerating force (required to overcome the inertia of the loaded shovel) to be exerted in a manner best suited to the human frame and anatomy.

It is another object of the present invention to provide an improved hand shovel that has an inherent mechanical advantage over existing hand shovels.

Other objects of the present invention will become apparent from the accompanying drawings, in which:

FIGURE 1 is a diagrammatic view of the lever principle inherent in the present invention, showing the downward actuating force and upward resulting lifting force associated therewith;

FIGURES 2, 3, and 4 are pictorial illustrations of three successive lift stages in the actual operation of one embodiment of the present invention;

FIGURES 5, 6, and 7 are close-up views of the position of the foot lever and coupling mechanism, corresponding substantially to the three successive stages of lift illustrated pictorially in FIGURES 2, 3, and 4, respectively;

Figure 1:
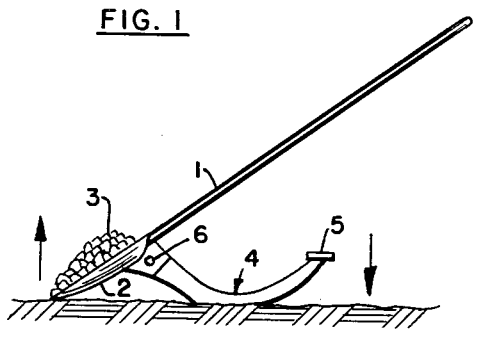

With reference to FIGURE 1, an existing hand shovel together with a curvilinear foot lever are illustrated diagrammatically for purposes of understanding the basic feature of the present invention. More specifically, a hand shovel is provided with a shank 1 and a blade 2, on which is positioned load 3. The essence of the present invention resides in the provision of a curvilinear foot lever 4 having a foot pedal 5 associated therewith and being hinged at point 6 with regard to blade 2. Foot lever 4 is illustrated schematically or diagrammatically in FIGURE 1 for purposes of understanding the basic principle of the present invention and the downward actuating force and upward resulting lifting force associated therewith, it being understood that the foot lever itself is susceptible of a variety of specific embodiments thereof. Foot lever 4 is disposed between the shovel and the operator and is convex with respect to the ground, while the foot lever 4 and the shank 1 of the shovel are disposed in a substantially common plane which is perpendicular to the ground. As shown diagrammatically in FIGURE 1, a down thrust upon foot pedal 5 will cause foot lever 4 to rock about the ground; and to impart an upward force to the shovel end of foot lever 4, thence by appropriate mechanical coupling to the load 3 on blade 2. The appropriate mechanical arrangements for implementing the essence of the present invention will now be explained together with the proper method of manipulating the apparatus to be described.

Figure 2:
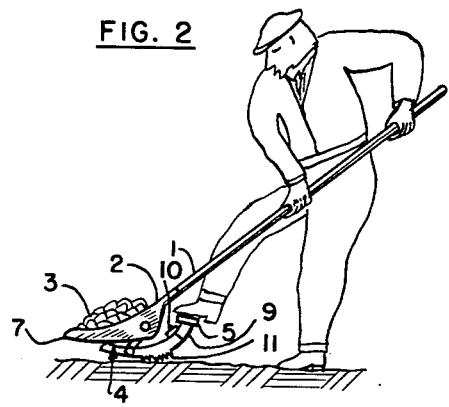
Figure 3:
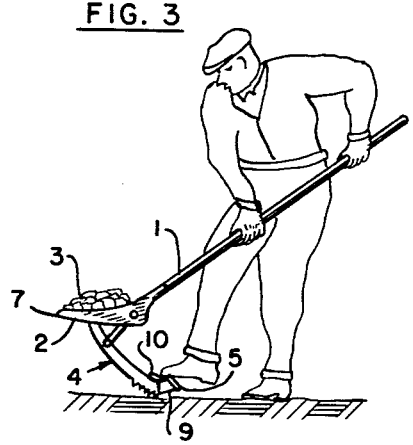
Figure 4:
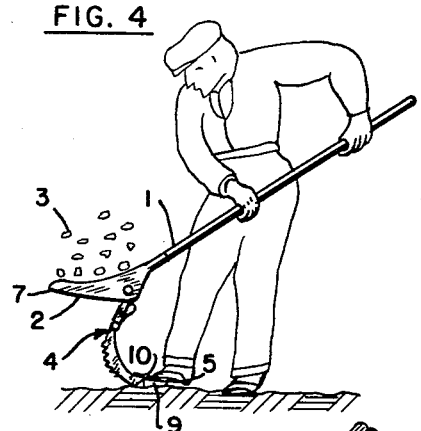

As shown in FIGURE 2, the blade 2 is inserted into the snow or other soft material to be shoveled in the conventional manner such that its tip 7 is approximately tangential to the surface of the ground. It is at this particular moment that the inherent feature of the present invention becomes manifestly desirable. In the conventional manner, the load must be lifted by the operator while he is in an awkward, crouched, and strained position; and the greatest force is required initially in order to overcome the inherent inertia of the load. This minimum required accelerating force is provided for in the present invention by means of the curvilinear foot lever 4 that allows the operator to utilize his weight and his normal walking muscles to an advantage. As shown in FIGURE 2, and in successive stages thereafter in FIGURES 3 and 4, the operator places his right foot upon foot pedal 5 and grasps the shank 1 of the shovel so that his right hand is located at or near the balance of the shank 1 and his left hand is located at or near the extremity of shank 1, it being understood that the shovel could be used in the opposite manner just as easily with the operator's left foot upon foot pedal 5, his left hand on the balance of shank 1, and his right hand at or near the extremity of shank 1. The operator then exerts a down thrust upon foot pedal 5 in a manner akin to taking a simple step and is thus able by means of the inherent leverage action to impart the initial movement or momentum of the load 3 on blade 2 as shown in FIGURES 3 and 4. Once the inherent inertia of the load has been thus overcome, the kinetic energy imparted to it will tend to offset the adverse pull of gravity during the initial lifting as well as for the brief moment when the operator removes his foot from foot pedal 5; thereafter, balance regained, the operator can easily complete the normal shoveling process from a comfortably upright stance. Further, a heavy down thrust of the foot will impart such upward momentum to the load that a simple hand-push sideways against shank 1 will deflect and spill the load to one side with no lifting exertion required.

FIGURES 2–4 then show three successive lift stages in the actual operation of one embodiment of the present invention. In the first stage (shown in FIGURE 2), the shovel has been placed under the load, and the operator has taken his initial position with his right foot placed on foot pedal 5. In the second stage (shown in FIGURE 3), the weight of the operator has been applied; and the downthrust of the operator's foot has resulted in an upward lifting force upon the load, or in other words, the load has acquired a vertical kinetic energy. In the third stage (shown in FIGURE 4)—assuming that the operator's weight has been applied briskly—the load continues its upward flight and may then be deflected to the left or to the right by a slight turning of the handle. If the operator's weight has been applied slowly, the load may be carried or deflected in the conventional manner, but without crouching.

Figure 5:
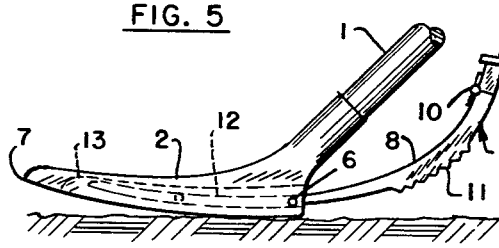
Figure 6:
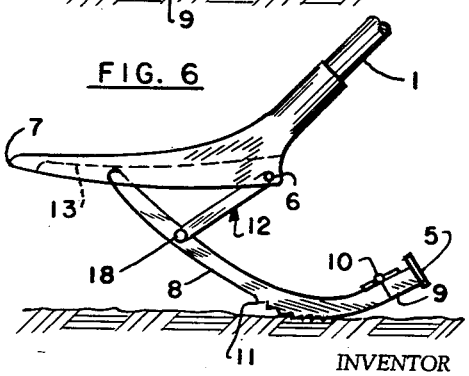
Figure 7:
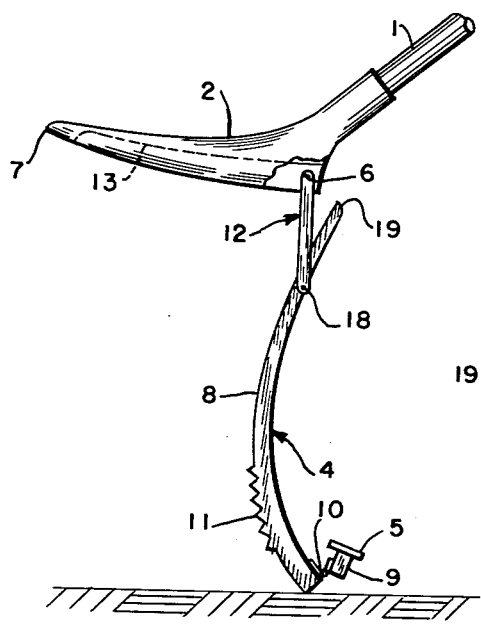
Figure 8:
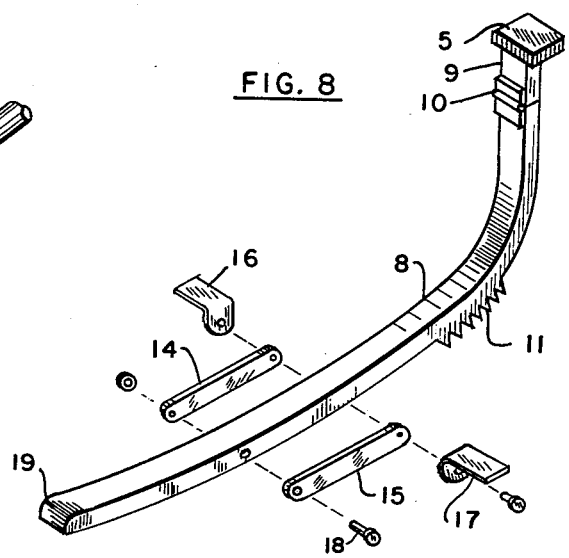
FIGURE 8 is an exploded view of the particular foot lever thereof.
Figure 9:
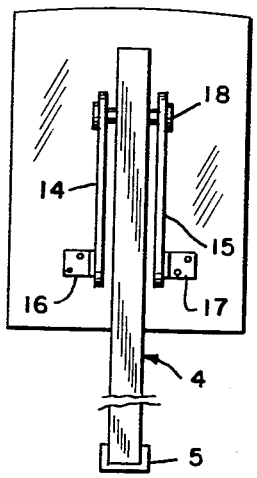
FIGURE 9 is a bottom view showing the relationship of the foot lever and coupling mechanism and the manner of securing the coupling mechanism to the shovel's blade.

The specific embodiment of the present invention that is illustrated pictorially in FIGURES 2, 3, and 4 is shown in greater detail in FIGURES 5, 6, and 7, respectively. Foot lever 4 is comprised of two members 8 and 9 that are suitably hinged together by means of a hinge 10. Moreover, foot lever 4 is substantially curvilinear and is provided with a serrated edge 11 along its apex in order to prevent slippage in the operation of the invention. A suitable foot pedal 5 is secured to the exposed extremity of foot lever 4; and the opposite portion of foot lever 4 rests initially within the hollow space or channel 13, which is ordinarily formed (or which may be deliberately fashioned) within blade 2. Foot lever 4 is mechanically coupled to the improved shovel by means of connecting linkage 12, the details of which are shown by the exploded view in FIGURE 8 as well as by the rear or end view of the shovel as shown in FIGURE 9. Connecting linkage 12 comprises extension arms 14 and 15 that are secured to the rear surface of blade 2 by means of suitable lugs 16 and 17, respectively. Foot lever 4 is pivotally secured to connecting linkage 12 by means of a suitable rivet 18, or by a suitable bolt, cotter pin, or other means; and it is seen that foot lever 4 is allowed to swing within the extension arms 14 and 15, which are made sufficiently long to allow the tip 19 of foot lever 4 to clear the rearmost portion of blade 2.

When the downward pressure of the operator's foot has been exerted upon foot pedal 5, curvilinear foot lever 4 is caused to rock about the ground; and an upward thrust is imparted to the load 3 on blade 2 by means of a two-fold force exerted through the opposite tip 19 of foot lever 4 and through the connecting linkage 12. The tip 19 of foot lever 4 continues to exert an upward force as it moves towards lugs 16 and 17 in the rear portion of blade 2; and at maximum down thrust the tip 19 passes through connecting linkage 12 and extension arms 14 and 15 thereof, which have now lost the ability to apply an upward thrust. Once the load 3 on blade 2 has been lifted a sufficient amount, the operator may then resume the shoveling operation as in the normal manner. A simple forward-and-back shake of the improved shovel will then reset foot lever 4 for the next cycle.

Since the tip 19 of the foot lever 4 is adapted to clear the rearmost portion of blade 2 near the completion of the lifting cycle, and since foot lever 4 is suitably hinged by means of hinge 10, it is seen that when the operator's foot pressure has forced foot pedal 5 to the ground, the load will continue its flight briefly due to a limited "free-wheeling" or "coaster-brake" action. This extra motion will allow the operator to work even faster. As soon as the foot pedal 5 touches the ground surface as shown in FIGURE 4, the operator can remove his foot, maintain his balance, and set himself for a side-motion applied with his hands, while the kinetic energy or momentum already imparted to the load still opposes the down-pull of gravity. If the pressure upon foot pedal 5 is moderate and slow, the foot lever 4 will remain rigid; however, if the pressure upon foot pedal 5 is heavy and quick, then the "free-wheeling" will take effect, increase the speed of the shoveling process, and permit the operator to remove his foot an inch or two from the lever while the load briefly resists the down-pull of gravity.

The overall operation of the improved shovel (namely, insertion, initial lifting, continued lifting, and finally, spilling of the load) is virtually identical to conventional snow shovels that are not equipped with my invention, but the most difficult and strenuous portion of the cycle—the initial lifting—is made considerably easier on the operator by the substitution of "stepping" for the convulsive straight-lifting under an adverse leverage. By using the walking-muscles plus the operator's weight to produce the initial movement of the load, the usual shoveling-muscles can thereafter continue the movement of the load and/or deflect it as desired with a minimum of bodily strain. It is well known that the action of walking or stepping produces a minimum of strain on the human physiology; in other words, the human body is best fitted for exerting force in this manner. Although the work done on the load remains the same, and although the path of the load through space is virtually identical, the important feature of the present invention is that the initial and greatest strain is applied in the manner best suited to the human frame and muscles.

Moreover, the present invention offers a decided mechanical advantage. In conventional shovels, the operator normally uses one of his hands as a fulcrum; and that particular hand will grasp the balance of the shovel at the shank thereof at a greater distance from the center of gravity of the loaded shovel than the serrated edge 11, which serves as the moving fulcrum of the present invention. For example, assume that the operator weighs 150 pounds and that the loaded shovel weighs 30 pounds. Now, because of the "free-wheeling" feature of the present invention, the operator can easily thrust downward quite vigorously with as much of his 150 pounds as he desires to employ. He has utilized his weight to an advantage, and he can do so without losing his balance. Moreover, a force of 150 pounds applied downward at a distance of say, one foot from the center of gravity, compares advantageously with the convulsive lifting strain necessary to move the same load under an adverse leverage of perhaps two feet from the center of gravity of the load. In the conventional shovel that lacks my invention, there are few operators who could exert an equal leverage while one of their hands must be used at least in part to constitute the fulcrum.

The present invention thus fulfills a critical need in an efficient, economical, reliable, and advantageous manner without the necessity for using springs, unusual linkages, or complicated and costly mechanisms.

Figure 10:
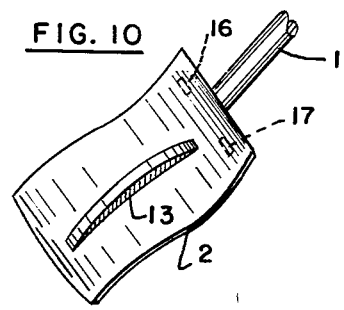
FIGURE 10 is a perspective view showing a means of providing a shallow impression in the shovel's blade at the time of manufacture in order to accommodate the moving end of the foot lever.

FIGURE 10 illustrates how a slight channel or trough 13 may be impressed in blade 2 (from below) at the time of manufacture in order to provide a guide for tip 19 of foot lever 4, so that blade 2 may be inserted smoothly into its prospective load. If desired, tip 19 could be provided with a roller bearing in order to avoid undue wear and to lessen the mechanical friction.

Figure 11:
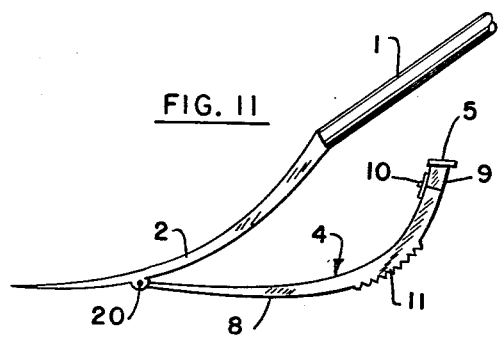
FIGURE 11 illustrates another embodiment of the present invention, wherein the foot lever is hinged and adapted to exert a force vertically below the center of gravity of the load.

Another embodiment of the present invention is illustrated in FIGURE 11, wherein foot lever 4 is of a more-simplified and economical design; and "free-wheeling" is provided only by means of hinge 10. Foot lever 4 may be secured to blade 2 of an existing shovel by means of a suitable connecting pivot-hole bracket 20.

Figure 12:
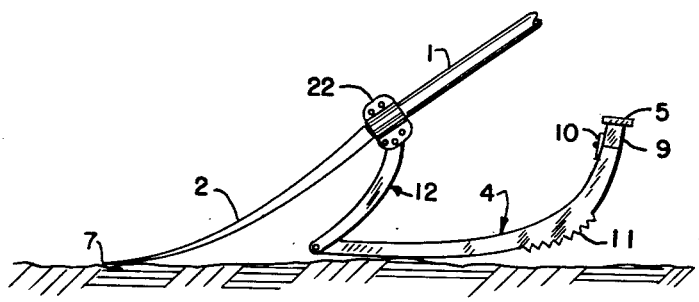
FIGURE 12 illustrates yet another embodiment of the present invention, wherein the hinged foot lever is provided as a separate attachment that may be adapted to an existing shovel.
Figure 13:
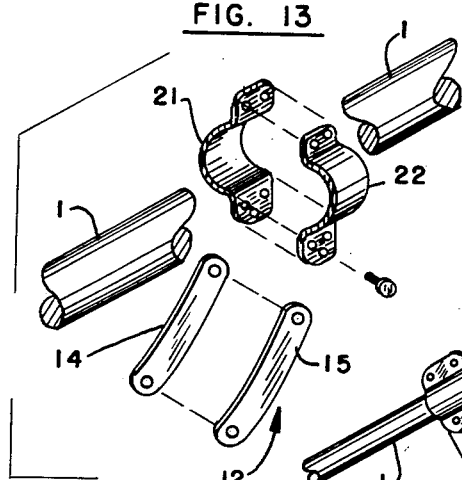
FIGURE 13 illustrates the details of coupling said separate attachment to an existing shovel.

FIGURES 12 and 13 illustrate yet another embodiment of the present invention and the method of mechanical coupling, respectively. Foot lever 4 and connecting linkage 12 could be secured to the shank 1 of the shovel by means of suitable curved brackets 21 and 22 which are connected to extension arms 14 and 15, respectively, of connecting linkage 12. Rivets, wing nuts, bolts or other suitable means may be used to couple brackets 21 and 22 to shank 1.

Figure 14:
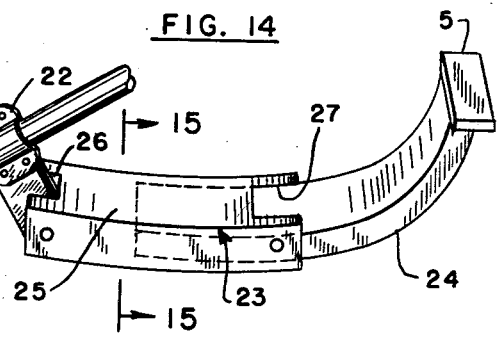
FIGURE 14 illustrates yet another embodiment of the hinged foot lever shown in FIGURE 12.
Figure 15:
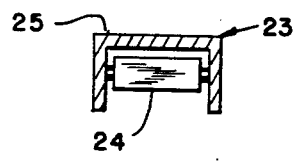
FIGURE 15 is a cross-section taken along the lines 15—15 of FIGURE 14.

A further variation of the embodiment of the present invention shown in FIGURES 12 and 13 is illustrated in FIGURES 14 and 15, wherein foot lever 4 essentially comprises two linked members 23 and 24. Member 23 comprises an inverted U-shaped channel and is adapted to receive a portion of member 24 that is pivoted therein. Member 23 also has a solid top 25 that is suitably cut back at 26 and 27 to allow a pivoting action at each end thereof. Where foot lever 4 is attached to the shank 1, the pivoting action is free; where member 24 is jointed to member 23, the pivoting action is one-way.

It is to be understood that the scope of the present invention is not necessarily limited to its detailed mechanizations thereof, but on the contrary, the specific embodiments are illustrated in the drawings and described in detail in the specification in order to emphasize, verify, and substantiate the basic foot-leverage principle inherent in the present invention and illustrated schematically or diagrammatically in FIGURE 1. Obviously, many other embodiments and modifications may be made without departing from the basic spirit of the present invention; and it is therefore understood that within the scope of the appended claims, the invention may be practiced other than as specifically described.

I claim:

1. A foot lever for a hand shovel of the type having a blade and a shank and being customarily used by an operator to lift a load off of the ground, comprising, a curved jointed lever disposed between the shovel and the operator and further disposed convex with respect to the ground, said lever and the shank of the shovel being disposed in a plane substantially perpendicular to the ground, said lever having a pair of ends and further having at least one portion intermediate said pair of ends resting initially upon the ground, means to pivotally connect said lever to the shovel at a point on said lever adjacent to one of said ends of said lever, and the other of said ends of said lever being initially raised off the ground to be engaged by the operator's foot, whereby a down thrust of the operator's foot upon the other of said ends of said lever causes said lever to rock upon the ground, and whereby an initial vertical lifting force is thereby imparted to the shovel through said pivotably-connected end of said lever.

2. A foot lever as defined in claim 1, wherein said lever between said intermediate portion and said one end includes a substantially straight elongated portion below the blade of the shovel, and wherein said means to pivotably connect said lever to the shovel includes a pair of linkage arms pivotably connecting said lever to said shovel at a point on the shovel adjacent to the junction of the blade and the shank, said linkage arms being longer than said elongated portion, whereby said elongated portion may swing through said linkage arms near the completion of the initial lifting of the load.

3. A foot lever as defined in claim 2, wherein the blade of the shovel has an underside which is provided with a longitudinal depression for housing said elongated portion of said lever.

4. A foot lever as defined in claim 1, wherein said lever is pivotably connected to the underside of the blade of the shovel at a point approximately in the midpoint of the blade.

5. A foot lever as defined in claim 1, wherein said means to pivotably connect said lever to the shovel includes a connecting linkage means, in combination with a pair of curved brackets embracing the shank of the shovel near the junction of the blade and the shank.

6. A foot lever as defined in claim 1, wherein said means to pivotably connect said lever to the shovel includes an inverted U-shaped channel.

References Cited in the file of this patent

UNITED STATES PATENTS

| | | |
|---|---|---|
| 803,142 | Ward | Oct. 31, 1905 |
| 943,325 | Stewart | Dec. 14, 1909 |
| 2,269,119 | Mason | Jan. 6, 1942 |
| 2,419,015 | Gascoigne et al. | Apr. 15, 1947 |
| 2,625,370 | Huggins | Jan. 13, 1953 |